(12) United States Patent
Cooper

(10) Patent No.: US 6,510,748 B2
(45) Date of Patent: Jan. 28, 2003

(54) PIPE CONNECTION SYSTEM

(76) Inventor: Michael S. Cooper, 26010 N. 1st Ave., Phoenix, AZ (US) 85085

( * ) Notice: Subject to any disclaimer, the term of this patent is extended or adjusted under 35 U.S.C. 154(b) by 0 days.

(21) Appl. No.: 09/736,546

(22) Filed: Dec. 13, 2000

(65) Prior Publication Data

US 2002/0069707 A1 Jun. 13, 2002

(51) Int. Cl.[7] .............................. G01F 1/28; A62C 35/60
(52) U.S. Cl. .................... 73/861.74; 200/81.9; 137/360
(58) Field of Search ......................... 73/866.5, 861.74; 138/155; 200/81.9; 215/80, 81, 321

(56) References Cited

U.S. PATENT DOCUMENTS

| | | | |
|---|---|---|---|
| 4,453,747 A | * | 6/1984 | Bimba ........................ 285/238 |
| 5,152,555 A | * | 10/1992 | Szabo ........................ 285/305 |
| 5,803,510 A | * | 9/1998 | Dorsey, III ................. 128/912 |
| 6,076,545 A | * | 6/2000 | Cooper ....................... 137/360 |

* cited by examiner

Primary Examiner—Harshad Patel
(74) Attorney, Agent, or Firm—Martin L. Stoneman

(57) ABSTRACT

A pipe connection system has a non-threaded, quick-pipe connection for connecting pipe in a pressurized system, for connecting piping components within a fire sprinkler system, including a flow switch to a fire sprinkler system riser port. A male and female member are attached through the use of a through-slot in the female member that aligns with a groove in the male member such that a locking clip may be inserted through the female and male members when they are joined, thereby blocking the members from being dis-joined. An O-ring seal in a groove on the male member and sealable bore on the female member allow for a sealed and pressurized piping system.

20 Claims, 2 Drawing Sheets

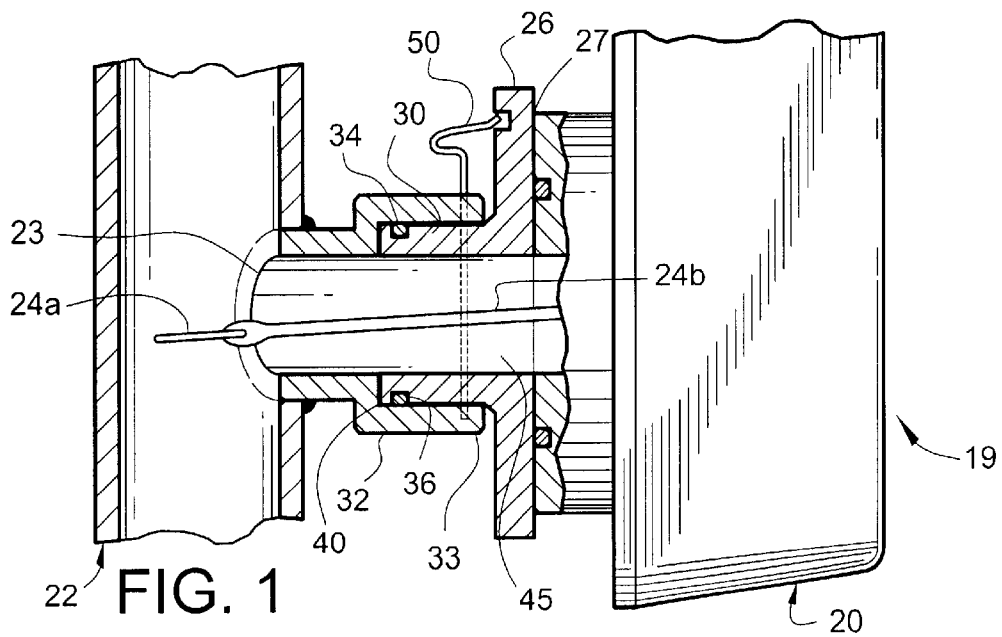
FIG. 1
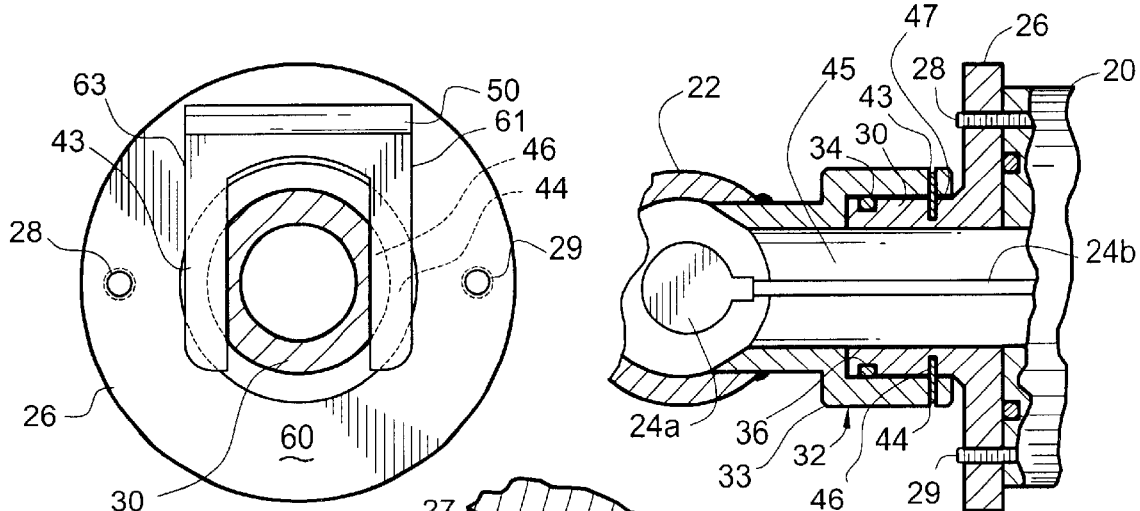
FIG. 2
FIG. 3
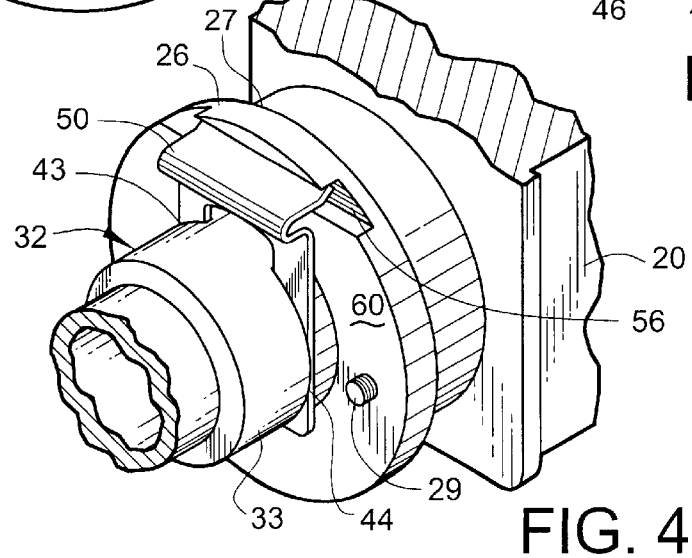
FIG. 4

PIPE CONNECTION SYSTEM

CROSS-REFERENCE TO RELATED APPLICATIONS

The present application is related to my co-pending application Ser. No. 09/596,627, filed Jun. 19, 2000, entitled "Fire Control Sprinkler System"; which was a continuation-in-part of my application Ser. No. 09/376,112, filed Feb. 1, 1999, entitled "Unitary Valve System", now abandoned; which was a continuation-in-part of my application Ser. No. 09/074,758, filed May 8. 1998, entitled "Unitary Valve System", now abandoned. The present application is also related to my issued U.S. Pat. No. 6,076,545. This patent and all of these applications are incorporated herein by this reference; and none are admitted to be prior art with respect to the present invention by their mention in this cross-reference section.

BACKGROUND

Typically, commercial buildings and an increasing number of residential structures are provided with fire suppression systems which dispense a fire suppression medium in the event of a fire. These fire sprinkler systems typically have a central pipe conduit to which are attached a labyrinth of individual piping systems containing a fire suppression medium under pressure. In the event of a fire, sensors which are attached to the individual piping systems are activated, thereby releasing the pressurized fire suppression medium in the hopes of quenching the fire. In many instances, the sudden release of system pressure activates a silent and/or audible alarm which alerts both those persons who are on the premises and the local fire authority that a fire is in progress. One such sensor device, which monitors the flow in the sprinkler system piping and is usually attached to the alarm system, is a flow switch.

Further, in plumbing fire-control sprinkler connections to a building water supply, the lower end of a riser pipe will be connected to a water supply pipe and the upper end will be connected to an outlet pipe to the sprinkler system, the riser pipe being typically stabilized in position by connecting it to the building structure, as by tying it to a beam. And certain useful components will be attached by porting to the riser pipe, usually the following: a flow switch to ascertain whether or not there is a flow in the riser pipe to the fire sprinkler system and to relay this information where needed, e.g., to fire departments; a test and drain valve to open the riser pipe to a drain for the purposes of testing, bleeding, etc.; a pressure gauge to deliver a read-out of the water pressure in the riser pipe; and a relief valve to open the riser pipe to a drain in the event a certain water pressure is exceeded in the riser pipe.

Efficient riser port and component arrangements have not yet achieved their potentials in terms of improved structures and efficient connections. This is especially true in the areas of adapting plastics techniques in novel ways to such efficient riser, port, and component arrangements. Flow switches are normally manufactured for connection plumbing by way of pipe threads, usually tapered pipe threads; however, there are many inefficiencies in such a connection. Eliminating such inefficient connections would permit elimination of: an unnecessary joint which may be a point of current or future leakages; a large brass adapter fitting which is supplied with the flow switch for threaded pipe mounting; the use and need for thread sealing materials such as Teflon tape or pipe dope; the need for a large size wrench or pipe wrench (to tighten a 1" N.P.T. tapered fitting requires a large amount of torque which, in turn, puts a great stress upon the entire manifold and pipe system; this stress could work loose the mounting brackets, screws, etc.); and the need to carefully orient the final positioning of the flow switch when rotating (tightening) the switch onto a threaded port for proper switch operation. Thus, a threaded attachment means: utilizing tapered pipe thread; a potential point of leakage; additional labor to assemble; unnecessary components; and added cost. There is a need in the industry for improved systems, methods and products for flow switch connection and for lower overall cost.

OBJECTS OF THE INVENTION

A primary object and feature of the present invention is to fulfill the above-mentioned needs by the provision of a pipe connection system that would provide a non-threaded, quick pipe connection for connecting pipe in a pressurized system. A further primary object and feature of the present invention is to provide a pipe connection system that would provide a non-threaded, quick pipe connection for connecting piping components to a fire sprinkler system riser port. And, a still further primary object and feature of the present invention is to provide a pipe connection system that would provide a non-threaded, quick pipe connection for connecting a flow meter to a fire sprinkler system riser port. Yet a further primary object and feature of the present invention is to provide such a pipe connection system which is efficient and inexpensive, as well as overcoming the other above-mentioned problems. Other objects of this invention will become apparent with reference to the following invention descriptions.

SUMMARY OF THE INVENTION

According to a preferred embodiment of this invention, this invention provides a pipe connection system for direct no-pipe-thread attachment, comprising: a first pipe portion, structured and arranged to contain a liquid under pressure, comprising an end portion having a longitudinal central axis; and a second pipe portion, structured and arranged to contain a liquid under pressure, comprising an end portion having a longitudinal central axis; wherein one such end portion of one such pipe portion comprises a male portion and the other such end portion of the other such pipe portion comprises a female portion structured and arranged to hold such male portion; wherein such male portion comprises at least one external groove lying in a plane perpendicular to such longitudinal central axis of such end portion of such one pipe portion; wherein such female portion comprises at least one slot passing through a wall of such female portion and lying in a plane perpendicular to such longitudinal central axis of such end portion of such other pipe portion; and wherein such slot and such groove are structured and arranged to be substantially in the same plane and substantially adjacent when such male and female portions are joined; and at least one seal structured and arranged to act to seal the pipe connection system when such male and female portions are joined; and at least one blocker structured and arranged to block disjoinder of such male and female portions, when joined, by entry of portions of such blocker into such slot and such groove; whereby, when such end portion of such first pipe portion and such end portion of such second pipe portion are co-axial and such male and female portions are joined, entry of such portions of such blocker into such slot and groove block disjoinder of such male and female portions, thereby securing a connection between such first pipe portion and such second pipe portion.

It also provides such a system wherein one such end portion comprises a flow switch. And it provides such a system further comprising a retainer structured and arranged to prevent inadvertent removal of such portions of such blocker from such entry. Further, it provides such a system wherein: such at least one slot comprises at least two respective parallel co-planar slots; and such at least one groove comprises at least two respective parallel co-planar grooves, each such respective groove being substantially adjacent each such respective slot. Also, it provides such a system wherein such blocker comprises at least two respective such portions of such blocker, such blocker being structured and arranged to provide entry of a first such respective portion of such blocker into a first such respective slot, and a first such respective groove concurrently with entry of a second such respective portion of such blocker into a second such respective slot-and a second such respective groove; and also, wherein such blocker comprises at least two substantially parallel legs, each such leg comprising a such blocker portion, and at least one blocker leg-connector portion.

Moreover, it provides such a system further comprising a retainer structured and arranged to prevent inadvertent removal of such portions of such blocker from such entry and wherein such retainer comprises such blocker leg-connector portion. And it provides such a system further comprising: a flow switch having a first face plate; wherein one such end portion of one such pipe portion comprises a flange having a first face and a second face; and wherein such first face of such flange is structured and arranged to connect with such first face plate. Also it provides such a system wherein such second face of such flange comprises a flange groove structured and arranged to removably retain such blocker leg-connector portion. Further, it provides such a system wherein such seal comprises an O-ring seal.

Even additionally, according to a preferred embodiment of this invention, this invention provides a connector element for connecting a flow switch, of the type comprising a housing including a face plate, connected by screw attachments for connecting the face plate to a flange member, a sensing switch within the housing, a connector member from the sensing switch extending through the face plate and further extending outside the housing to a sensing paddle, to a fire sprinkler riser port comprising a female second connector element, comprising, in combination: a pipe, having a longitudinal central axis, comprising a first end portion of a first end and a second end portion of a second end; wherein such first end portion of such pipe comprises a cylindrical male extension structured and arranged to fit with the female second connector element; wherein such second end portion of such pipe comprises a flange having a first face and a second face; wherein an outer surface of such male extension comprises: at least one first groove lying in a first plane perpendicular to such longitudinal central axis; and at least one circumferential second groove, lying in a second plane perpendicular to such longitudinal central axis, structured and arranged to receive a seal; wherein such second groove is nearer such first end than is such first groove; and wherein such first face of such flange is structured and arranged to connect with the face plate of the flow switch.

Further, it.provides such a system wherein such second face of such flange comprises a third groove structured and arranged to removably retain a portion of a structural element. Even further, it provides such a system further comprising a seal held in such circumferential second groove; wherein.such seal comprises an O-ring seal. Still further, it provides such a system further comprising a flow switch attached with such first face of such flange of such connector element; and, also, further comprising a riser port attached with such cylindrical male extension.

Still in addition, according to a preferred embodiment of this invention, this invention provides a connector element for connecting a flow switch male connector element to a fire sprinkler riser port, comprising, in combination: a pipe portion, having a longitudinal central axis, comprising a first end portion at a first end and a second end portion at a second end; wherein such first end portion of such pipe portion comprises a female cylindrical recess structured and arranged to hold the male connector element; wherein such second end of such pipe comprises the fire sprinkler riser port; wherein a pipe wall of such female cylindrical recess comprises at least one slot passing through such pipe wall and lying in a plane perpendicular to such longitudinal central axis; and wherein such female cylindrical recess comprises a sealable inner surface. And it provides such a system further comprising a flow switch assembly attached with such female cylindrical recess.

Even moreover, according to a preferred embodiment of this invention, this invention provides a flow switch, adapted for a direct no-pipe-thread connection to a riser port comprising a female cylindrical recess, comprising, in combination: a pipe, having a longitudinal central axis, comprising a first end portion of a first end and a second end portion of a second end; wherein such first end portion of such pipe comprises a cylindrical male extension, structured and arranged to fit with the female cylindrical recess, and further comprises a protruding sensing paddle; wherein such second end portion of such pipe comprises a flow switch housing containing a flow switch having such sensing paddle attached; wherein an outer surface of such cylindrical male extension comprises at least one first groove lying in a first plane perpendicular to such longitudinal central axis, and at least one circumferential second groove, lying in a second plane perpendicular to such longitudinal central axis, structured and arranged to receive a seal, and wherein such second groove is nearer such first end than is such first groove.

BRIEF DESCRIPTION OF THE DRAWINGS

FIG. 1 is a side view, partially in section, of a preferred embodiment of the pipe connection system of the present invention, illustrating an improved connection between a flow switch and a sprinkler system fire riser vertical pipe.

FIG. 2 is a front view, partially in section, through section 2—2 of FIG. 1.

FIG. 3 is a cross-sectional plan view through section 3—3 of FIG. 1.

FIG. 4 is a perspective view of a preferred embodiment of the present invention illustrating an improved piping connection (between a flow switch and a pipe.)

DETAILED DESCRIPTION OF A PREFERRED EMBODIMENT OF THE INVENTION

Figure 5:
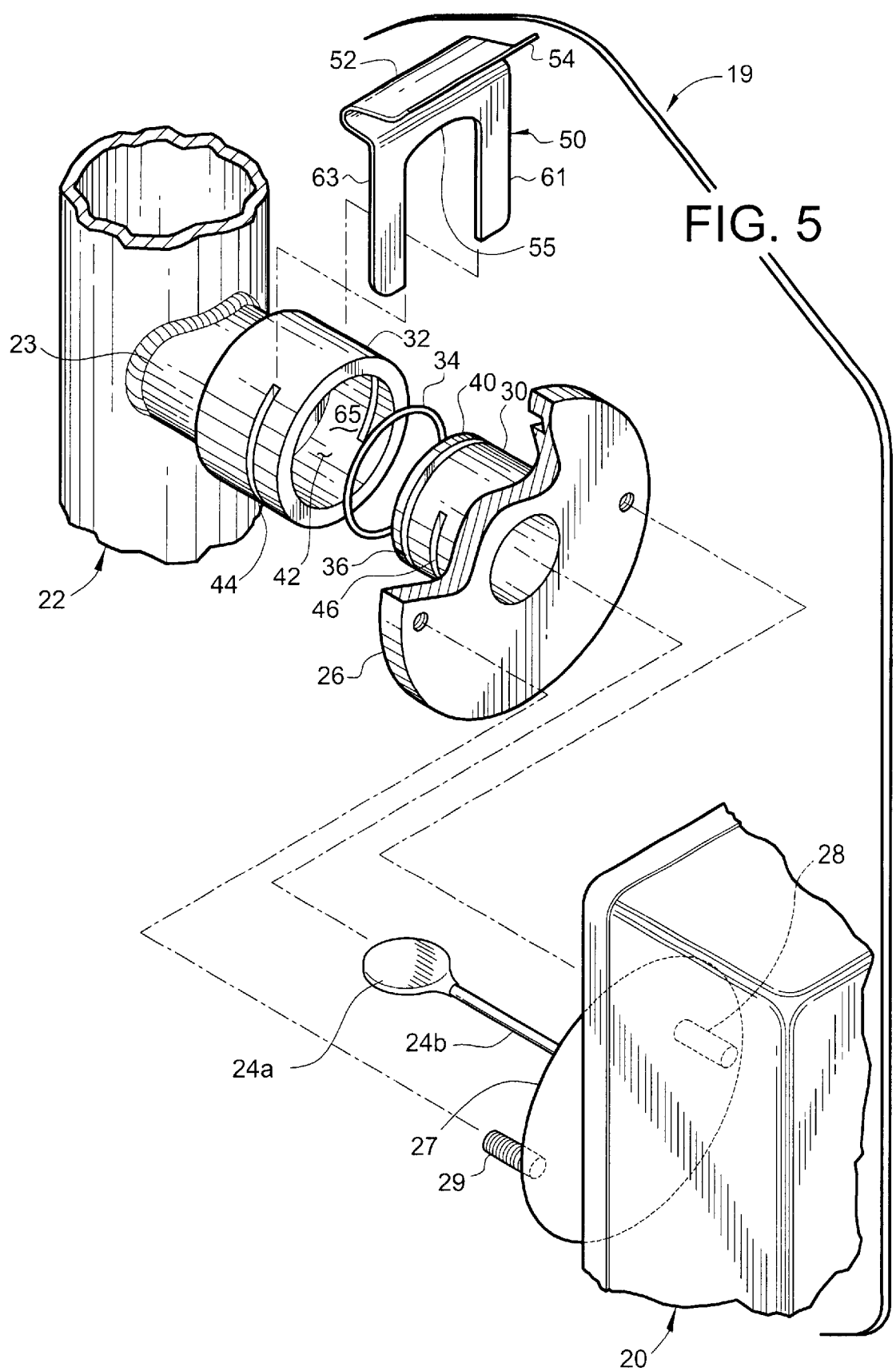
FIG. 5 is an exploded view of the flow meter sprinkler system fire riser vertical.pipe components according to the preferred embodiment of the present invention as illustrated in FIG. 4.

FIGS. 1 and 5 illustrate a preferred embodiment of the pipe connection system 19 of the present invention illustrating an improved connection between a flow switch 20 and a fire sprinkler system vertical manifold riser 22. Illustrated in FIG. 1 is vertical manifold riser 22, with an attached flow switch 20, which utilizes its included sensing paddle 24 (also shown in FIG. 3 and comprising paddle portion 24a and connector member, or rod portion, 24b) to monitor water flow within the interior of riser 22. Riser 22 typically consists of a cylindrical pipe body with one port 23 (embodying herein a riser port attached with such cylindrical male extension) or multiple ports. In the event of fire sprinkler activation (or testing), water flow through riser 22 is recognized by flow switch 20, which activates in well-known ways, and typically sends an electrical signal. This electrical signal may typically then be used to actuate an alarm or bell within the environment and may additionally be used to notify a fire station. The operation and use of a flow switch 20 in fire system alarms is well-known by those skilled in the art and not further discussed.

In a preferred embodiment of the pipe connection system 19, the flow switch 20 mates and secures to the riser 22 by means of a mounting flange 26, as shown, (this arrangement embodying herein wherein such first face of such flange is structured and arranged to connect with the face plate of the flow switch; and wherein a flow switch is attached with such first face of such flange of such connector element) attached to the face 27 (the attached subassembly of the flow meter and the flange 26 connector embodying herein a flow switch assembly attached with such female cylindrical recess) of flow switch 20 (embodying herein a flow switch having a first face plate; and wherein one such end portion of one such pipe portion comprises a flange having a first face and a second face; and wherein such first face of such flange is structured and arranged to connect with such first face plate) in combination with a mounting flange 32, which is preferably integral with the riser 22 (embodying herein wherein such second end of such pipe comprises the fire sprinkler riser port). The above arrangement embodies herein a pipe connection system 19.

As further illustrated in FIGS. 1–5, the mounting flange 26 is appropriately sized, spaced, and oriented.to be compatible with the mounting requirements of flow switch 20 (embodying herein wherein one such end portion comprises a flow switch). Mounting flange 26 is preferably screwed onto.the face 27 of flow switch 20 with mounting screws 28 and 29. Illustrated are mounting screws 28 and 29 which are preferably externally threaded and screwed into an appropriately sized orifice in face 27 with matching internal threads.

Mounting flange 26 preferably comprises a male pipe portion 30. Preferably, male pipe portion 30 has at least one O-ring seal 34 (embodying herein at least one seal structured and arranged to act to seal the pipe connection system when such male and female portions are joined) inserted into a circumferential groove 36 (embodying herein wherein such male portion comprises at least one external groove lying in a plane perpendicular to such longitudinal central axis of such end portion of such one pipe portion) recessed into the leading portion 40 of the male pipe portion 30. The mounting flange 32 on riser 22 is embodied as the female pipe portion 33 and includes an equivalent and appropriately sized counterbore recess 42 (embodying herein a flow switch assembly attached with such female cylindrical recess), as shown in FIG. 5, with depths and diameters required for accepting the male pipe portion 30, along with sensing paddle 24 and O-ring seal 34. The above arrangement embodies herein a pipe connection system 19 for direct no-pipe-thread attachment, comprising: a first pipe portion, structured and arranged to contain a liquid under pressure, comprising an end portion having a longitudinal central axis; and a second pipe portion, structured and arranged to contain a liquid under pressure, comprising an end portion having a longitudinal central axis; wherein one such end portion of one such pipe portion comprises a male portion 30, and the other such end portion of the other such pipe portion comprises a female portion 33, structured and arranged to hold such male portion 30. Those skilled in the art will recognize that the pipe sizing and associated counterbore recess 42 may be varied in size, due to the flow requirements of the system and as such, no specific size is stated. In addition, those skilled in the art will recognize the usefulness that the male pipe portion 30 and female pipe portion 33 may, in appropriate circumstances, be reversed in order such that the riser comprises the male portion and the flow switch comprises the female portion. When mounting the flow switch 20 (shown in FIG. 1) to the riser 22, the sensing paddle 24 along with male pipe portion 30 and attached O-ring seal 34 is inserted into the counterbore recess 42 of the mounting flange 32, with the sensing paddle 24 oriented perpendicular to the axis of the riser 22. Preferably, the aforementioned attachment firmly sandwiches the O-ring seal 34 between the male pipe portion 30 and the wall of the counterbore recess 42, thus retaining the sensing paddle 24 and providing a seal within the now combined pipe 45 (embodying herein a pipe, having a longitudinal central axis, comprising a first end portion of a first end and a second end portion of a second end).

Preferably, and uniquely, in the above embodiment, the mounting flange 32 has two slots 43 and 44 (embodying herein wherein such female portion comprises at least one slot passing through a wall of such female portion and lying in a plane perpendicular to such longitudinal central axis of such end portion of such other pipe portion). Preferably, "parallel" (as shown) slots 43 and 44 are formed as two opposing slots perpendicular to the longitudinal axis in the mounting flange 32 (embodying herein at least one slot comprising at least two respective parallel co-planar slots). Preferably male pipe portion 30 has two grooves 46 and 47. Grooves 46 and 47 are formed as two opposing grooves perpendicular to the longitudinal first axis in male pipe portion 30 (embodying herein at least one groove comprising at least two respective parallel co-planar grooves, each such respective groove being substantially adjacent each such respective slot; and wherein an outer surface of such male extension comprises at least one first groove lying in a first plane perpendicular to such longitudinal central axis). As illustrated in FIG. 3, preferably, slot 44 is structured and arranged to match up with adjacent groove 46; and slot 43 is structured and arranged to match up with adjacent groove 47 (as shown) cut into the structure of male pipe portion 30, as shown (embodying herein wherein such slot and such groove are structured and arranged to be substantially in the same plane and substantially adjacent when such male and female portions are joined). Although it may be possible to use a single slot and groove, it is preferable (primarily for structural stability) to use two slots and two grooves. Preferably, a blocking element or locking clip 50 is inserted simultaneously into slots 43 and 44, and grooves 46 and 47, such that locking clip 50 firmly blocks mounting flange 32 and mounting flange 26 from coming apart, thereby connecting the flow switch 20 to the riser 22 (the arrangement above embodying herein at least one blocker structured and arranged to block disjoinder of such male and female portions, when joined, by entry of portions of such blocker into such slot and such groove; and whereby, when such end portion of such first.pipe portion and such end portion of such second pipe portion are co-axial and such male and female portions are joined, entry of such portions of such blocker into such slot and groove block disjoinder of such male and female portions, thereby securing a connection between such first pipe portion and such second pipe portion). Those skilled in the art will recognize that the width and depth of slots 43 and 44, and grooves 46 and 47 will vary according to what is required to block the pipe portions (e.g., male pipe portion 30 and female pipe portion 33) under a prescribed pressure within the pipe, pipe thickness dimensions and overall pipe pressure requirements (200 pounds per square inch in a typical fire sprinkler pipeline). However, preferably, the slots 43 and 44 are about ⅛- to about ¼-inch in width extending in a vertical plane such that the slot penetrates completely through the mounting flange 32 pipe, as shown in FIGS. 1–5. Preferably, grooves 46 and 47 are about ⅛- to about ¼-inch in width and about ⅛- to about ¼-inch in depth, (depending on the pipe diameter, pipe thickness and the associated pressure requirements that the pipe is required to contain).

Locking clip 50 is preferably sized to fit tightly into slots 43 and 44, and grooves 46 and 47 (embodying herein wherein such blocker comprises at least two respective such portions of such blocker, such blocker being structured and arranged to provide entry of a first such respective portion of such blocker into a first such respective slot and a first such respective groove concurrently with entry of a second such respective portion of such blocker into a second such respective slot and a second such respective groove). Preferably, locking clip 50 is made of a metal (or similarly strong material) such that it will effectively block mounting flange 32 and mounting flange 26 from coming apart. Locking clip 50 is preferably U-shaped, as shown clearly in FIG. 5. Locking clip 50, therefore, has a bridging piece 55 (the above arrangement embodying herein wherein such blocker comprises: at least two substantially parallel legs, each such leg comprising a such blocker portion; and at least one blocker leg-connector portion). The bridging piece 55 is preferably integral to the locking clip 50 and bridges the two blocking legs 61 and 63. Further, locking clip 50 has a bent portion 52 which is made from a material that has innate spring tension (e.g., sprung steel). Preferably, there is a groove 56 in the face 60 (embodying herein such second face of such flange comprising a third groove structured and arranged to removably retain a portion of a structural element) of mounting flange 26 (embodying herein a retainer structured and arranged to prevent inadvertent removal of such portions of such blocker from such entry), arranged such that it will receive the end 54 of locking clip 50, when locking clip 50 is fully and completely engaged in slot 44 and groove 46 (the above arrangement embodying herein wherein such retainer comprises such blocker leg-connector portion; and wherein such second face of such flange comprises a flange groove structured and arranged to removably retain such blocker leg-connector portion). Further, the end 54 of locking clip 50, will "lock" into groove 56 (utilizing the engineering of the bent portion 52) when it is inserted (i.e., snaps into the groove 56 while being inserted) into the slot 44 and groove 46, as shown. Preferably, the removal of the locking clip 50 means that the end 54 of locking clip 50 must be unsprung (utilizing the engineering of the bent portion 52) and removed from groove 56. Those skilled in the art may choose to do this by hand, a specially designed tool, or even a screwdriver. In fact, there may be many possibilities, selectable by those skilled in the art, to perform this unlocking function.

FIG. 2 even further illustrates the connection of the locking clip 50 connection. As illustrated, the locking clip 50 is shown positioned such that it simultaneously penetrates through slots 43 and 44, and grooves 46 and 47, whereby locking clip 50 firmly locks into place mounting flange 32 and mounting flange 26.

An example of the use of the above described embodiment of the pipe connection system 19 in operation is as follows: Preferably, in one preferred embodiment, the pipe connection system is used to attach a flow switch to a fire riser as part of a complete fire sprinkler system. The fire riser 22 has at least one port which has an integral female pipe portion 33 mounting flange 32 attached. Preferably, the fire riser 22 is installed first in a stationary location. The fire riser 22 is preferably installed in a vertical position, as shown in FIG. 1. The flow switch 20 is preferably pre-assembled with the mounting flange 26 attached to the face 27 of the flow switch 20, preferably screwed onto the face 27 of flow switch 20 with mounting screws 28 and 29. As stated above, mounting flange 26 preferably comprises a male pipe portion 30. Preferably, male pipe portion 30 has at least one O-ring seal 34 inserted into a circumferential groove 36 (embodying herein at least one circumferential second groove, lying in a second plane perpendicular to such longitudinal central axis, structured and arranged to receive a seal; and a seal held in such circumferential second groove) recessed into the leading portion 40 of the male pipe portion 30 (embodying herein wherein such second groove is nearer such first end than is such first groove). In this position, the sensing paddle 24 protrudes through the male pipe portion 30 (embodying herein wherein such first end portion of such pipe comprises a cylindrical male extension, structured and arranged to fit with the female cylindrical recess, and further comprises a protruding sensing paddle). The flow switch 20 is carefully inserted into the mounting flange 32 on riser 22 embodied as the female pipe portion 33 with an equivalent and appropriately sized counterbore recess 42 (embodying herein wherein such first end portion of such pipe portion comprises a female cylindrical recess structured and arranged to hold the male connector element), along with the sensing paddle 24 and O-ring seal 34. The pipe portions are sized such that the sensing paddle 24 will be positioned in the riser 22 as shown in FIG. 3, approximately in the center of riser 22, and that the O-ring seal will seal against the inside surface 65 (see FIG. 5) of the female pipe portion 33 (embodying herein wherein such female cylindrical recess comprises a sealable inner surface). Preferably, the male pipe portion 30 and female pipe portion 33 are sized such that the slots 43 and 44, and grooves 46 and 47 will align in a preferably vertical position such that locking clip 50 may be inserted .so that it simultaneously penetrates through slots 43 and 44 and grooves 46 and 47. When firmly in place, locking clip 50 locks mounting flange 32 and mounting flange 26 so that they cannot be pulled apart. Further, locking clip 50 has a bent portion 52 which is made from a material that has innate spring tension (e.g., sprung steel). Preferably, there is a groove 56 in the face 60 of mounting flange 26, arranged such that it will receive the end 54 of locking clip 50, when locking clip 50 is fully and completely engaged in slots 43 and 44, and grooves 46 and 47. Locking clip 50 is fully inserted into slots 43 and 44, and grooves 46 and 47 and the end 54 is then snapped into groove 56 in the face 60 of mounting flange 26. This completes the connecting operation. The dis-connecting operation works in reverse of the connecting operation.

In addition, many other advantages of applicant's invention will be apparent to those skilled in the art from the above descriptions and the below claims.

What is claimed is:

1. A pipe connection system for direct no-pipe-thread attachment, comprising:

a. a first pipe portion, structured and arranged to contain a liquid under pressure, comprising an end portion having a longitudinal central axis; and b. a second pipe portion, structured and arranged to contain a liquid under pressure, comprising an end portion having a longitudinal central axis;

c. wherein one said end portion of one said pipe portion comprises a male portion and the other said end portion of the other said pipe portion comprises a female portion structured and arranged to hold said male portion;

d. wherein said male portion comprises at least one external groove lying in a plane perpendicular to said longitudinal central axis of said end portion of said one pipe portion;

e. wherein said female portion comprises at least one slot passing through a wall of said female portion and lying in a plane perpendicular to said longitudinal central axis of said end portion of said other pipe portion; and f. wherein said slot and said groove are structured and arranged to be substantially in the same plane and substantially adjacent when said male and female portions are joined; and g. at least one seal structured and arranged to act to seal the pipe connection system when said male and female portions are joined; and h. at least one blocker structured and arranged to block disjoinder of said male and female portions, when joined, by entry of portions of said blocker into said slot and said groove;

i. whereby, when said end portion of said first pipe portion and said end portion of said second pipe portion are co-axial and said male and female portions are joined, entry of said portions of said blocker into said slot and groove block disjoinder of said male and female portions, thereby securing a connection between said first pipe portion and said second pipe portion.

2. The pipe connection system according to claim 1 wherein one said end portion comprises a flow switch.

3. The pipe connection system according to claim 1 further comprising a retainer structured and arranged to prevent inadvertent removal of said portions of said blocker from said entry.

4. The pipe connection system according to claim 1 wherein:

a. said at least one slot comprises at least two respective parallel co-planar slots; and b. said at least one groove comprises at least two respective parallel co-planar grooves, each said respective groove being substantially adjacent each said respective slot.

5. The pipe connection system according to claim 4 wherein said blocker comprises at least two respective said portions of said blocker, said blocker being structured and arranged to provide entry of a first said respective portion of said blocker into a first said respective slot and a first said respective groove concurrently with entry of a second said respective portion of said blocker into a second said respective slot and a second said respective groove.

6. The pipe connection system according to claim 5 wherein said blocker comprises:

a. at least two substantially parallel legs, each said leg comprising a said blocker portion; and b. at least one blocker leg-connector portion.

7. The pipe connection system according to claim 6 further comprising a retainer structured and arranged to prevent inadvertent removal of said portions of said blocker from said entry.

8. The pipe connection system according to claim 7 wherein said retainer comprises said blocker leg-connector portion.

9. The pipe connection system according to claim 8 further comprising:

a. a flow switch having a first face plate;

b. wherein one said end portion of one said pipe portion comprises a flange having a first face and a second face; and c. wherein said first face of said flange is structured and arranged to connect with said first face plate.

10. The pipe connection system according to claim 9 wherein said second face of said flange comprises a flange groove structured and arranged to removably retain said blocker leg-connector portion.

11. The pipe connection system according to claim 1 wherein said seal comprises an O-ring seal.

12. A connector element for connecting a flow switch comprising a housing including a face plate, connected by screw attachments for connecting the face plate to a flange member, a sensing switch within the housing, a connector member from the sensing switch extending through the face plate and further extending outside the housing to a sensing paddle, to a fire sprinkler riser port comprising a female second connector element, comprising, in combination:

a. a pipe, having a longitudinal central axis, comprising a first end portion of a first end and a second end portion of a second end;

b. wherein said first end portion of said pipe comprises a cylindrical male extension structured and arranged to fit with the female second connector element;

c. wherein said second end portion of said pipe comprises a flange having a first face and a second face;

d. wherein an outer surface of said male extension comprises:

i. at least one first groove lying in a first plane perpendicular to said longitudinal central axis; and ii. at least one circumferential second groove, lying in a second plane perpendicular to said longitudinal central axis, structured and arranged to receive a seal;

iii. wherein said second groove is nearer said first end than is said first groove; and e. wherein said first face of said flange is structured and arranged to connect with the face plate of the flow switch.

13. The connector element according to claim 12 wherein said second face of said flange comprises a third groove structured and arranged to removably retain a portion of a structural element.

14. The connector element according to claim 12 further comprising a seal held in said circumferential second groove.

15. The connector element according to claim 14 wherein said seal comprises an O-ring seal.

16. The connector element according to claim 15 further comprising a flow switch attached with said first face of said flange of said connector element.

17. The connector element according to claim 16 further comprising the riser port comprising the female second connector element attached with said cylindrical male extension.

18. A connector element for connecting a flow switch male connector element to a fire sprinkler riser port, comprising, in combination:

a. a pipe portion, having a longitudinal central axis, comprising a first end portion at a first end and a second end portion at a second end;

b. wherein said first end portion of said pipe portion comprises a female cylindrical recess structured and arranged to hold the male connector-element;

c. wherein said second end of said pipe comprises the fire sprinkler riser port;

d. wherein a pipe wall of said female cylindrical recess comprises at least one slot pas-sing through said pipe wall and lying in a plane perpendicular to said longitudinal central axis; and e. wherein said female cylindrical recess comprises a sealable inner surface.

19. The connector element claim according to claim 18 further comprising a flow switch assembly attached with said female cylindrical recess.

20. A flow switch, adapted for a direct no-pipe-thread connection to a riser port comprising a female cylindrical recess, comprising, in combination:

a. a pipe, having a longitudinal central axis, comprising a first end portion of a first end and a second end portion of a second end;

b. wherein said first end portion of said pipe comprises a cylindrical male extension, structured and arranged to fit with the female cylindrical recess, and further comprises a protruding sensing paddle;

c. wherein said second end portion of said pipe comprises a flow switch housing containing a flow switch having said sensing paddle attached;

d. wherein an outer surface of said cylindrical male extension comprises:

i. at least one first groove lying in a first plane perpendicular to said longitudinal central axis; and ii. at least one circumferential second groove, lying in a second plane perpendicular to said longitudinal central axis, structured and arranged to receive a seal; and iii. wherein said second groove is nearer said first end than is said first groove.

* * * * *